(12) United States Patent
Hasegawa et al.

(10) Patent No.: US 12,085,270 B2
(45) Date of Patent: Sep. 10, 2024

(54) ILLUMINATION APPARATUS

(71) Applicant: Japan Display Inc., Tokyo (JP)

(72) Inventors: Makoto Hasegawa, Tokyo (JP); Masafumi Okada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/473,363

(22) Filed: Sep. 25, 2023

(65) Prior Publication Data

US 2024/0110687 A1  Apr. 4, 2024

(30) Foreign Application Priority Data

Sep. 29, 2022 (JP) ................................. 2022-155978

(51) Int. Cl.
| | |
|---|---|
| *F21V 3/04* | (2018.01) |
| *F21V 7/04* | (2006.01) |
| *F21V 7/16* | (2006.01) |
| *F21W 131/30* | (2006.01) |
| *F21Y 115/10* | (2016.01) |

(52) U.S. Cl.
CPC .................. *F21V 3/04* (2013.01); *F21V 7/04* (2013.01); *F21V 7/16* (2013.01); *F21W 2131/30* (2013.01); *F21Y 2115/10* (2016.08)

(58) Field of Classification Search
CPC .... F21V 3/04; F21V 7/04; F21V 7/16; F21W 2131/30; F21Y 2115/10; G02B 19/0061; G02B 19/0023; G02B 19/0028
See application file for complete search history.

(56) References Cited

U.S. PATENT DOCUMENTS

| | | | |
|---|---|---|---|
| 2012/0002412 A1* | 1/2012 | Cheng .................... | F21V 7/09 |
| | | | 362/235 |
| 2017/0138565 A1* | 5/2017 | Ko ........................... | F21V 7/04 |
| 2021/0018158 A1* | 1/2021 | Martinez Weber ... | F21V 7/0041 |
| 2023/0076604 A1* | 3/2023 | Okada ..................... | F21V 7/06 |

FOREIGN PATENT DOCUMENTS

| | | |
|---|---|---|
| JP | H08-334701 A | 12/1996 |
| JP | 2006-313213 A | 11/2006 |

* cited by examiner

*Primary Examiner* — Tracie Y Green
(74) *Attorney, Agent, or Firm* — Michael Best & Friedrich LLP

(57) ABSTRACT

Provided is an illumination apparatus capable of forming ring-shaped irradiation light by using a simple configuration. Also provided is an illumination apparatus capable of freely changing a shape of the ring-shaped irradiation light. In order to achieve these objects, the present invention has the following means. That is, the illumination apparatus includes a first reflector having a first hole where a light source is arranged, a second hole that emits light, and a reflecting curved surface that connects the first hole and the second hole with each other, a light shield arranged at an area including a center of the second hole as seen in plan view, an opening portion formed in a ring-shaped manner between an inner edge of the second hole and an outer edge of the light shield, and a liquid crystal lens arranged so as to cover the opening portion.

12 Claims, 18 Drawing Sheets

A–A

B–B

ILLUMINATION APPARATUS

CLAIM OF PRIORITY

The present application claims priority from Japanese Patent Application JP 2022-155978 filed on Sep. 29, 2022, the content of which is hereby incorporated by reference into this application.

BACKGROUND OF THE INVENTION

1. Field of the Invention

The present invention relates to an illumination apparatus capable of providing ring-shaped irradiation light.

2. Description of the Related Art

There are cases where ring-shaped illumination light is necessary as shooting light, special illumination, and the like. Also, in optical instruments such as microscopes and manufacturing apparatuses such as exposure apparatuses, there are cases where ring-shaped irradiation light is necessary.

Japanese Patent Laid-open No. Hei 8-334701 describes that ring-shaped irradiation light is obtained by causing a phase diffraction grating and an axicon prism to act on laser light. Japanese Patent Laid-open No. 2006-313213 describes that ring-shaped illumination light is obtained by causing a donut lens, a ring-shaped opening, and a condenser lens to act on collimated light and projecting an image of the ring-shaped opening onto a focus position.

SUMMARY OF THE INVENTION

The technologies described in prior literature are illumination apparatuses used for comparatively small apparatuses such as microscopes.

Also, the apparatuses described therein require comparatively complex optics.

It is an object of the present invention to provide an illumination apparatus capable of dealing with comparatively large ring-shaped illumination light such as illumination for shooting, and additionally forming ring-shaped illumination light by using comparatively simple optics. Also, it is another object of the present invention to provide an illumination apparatus capable of being used for microscopes, exposure apparatuses, and the like by reducing an outer shape of the illumination apparatus in the case where ring-shaped irradiation light is necessary.

The present invention solves the above problems and has the following main specific means:

(1) An illumination apparatus including a first reflector having a first hole where a light source is arranged, a second hole that emits light, and a reflecting curved surface that connects the first hole and the second hole, a light shield arranged at an area including a center of the second hole as seen in plan view, an opening portion formed in a ring-shaped manner between an inner edge of the second hole and an outer edge of the light shield, and a liquid crystal lens arranged so as to cover the opening portion.

(2) The illumination apparatus according to (1), in which the first reflector has a rectangular parallelepiped outer shape, the first hole is formed in a first surface of the rectangular parallelepiped, the second hole is formed in a second surface opposed to the first surface, and a main surface of the light shield is formed parallel to the second surface.

(3) The illumination apparatus according to (1), in which the curved surface of the first reflector has a first curved surface close to the first hole and a second curved surface close to the second hole, and part of the second curved surface has a hyperboloid or a paraboloid.

(4) The illumination apparatus according to (3), in which a second reflector is arranged between the light shield and the light source, and a surface of the second reflector on a side opposed to the light source is a third reflecting surface.

DETAILED DESCRIPTION OF THE PREFERRED EMBODIMENTS

The present invention will be described below by using embodiments.

Embodiment 1

Figure 1:
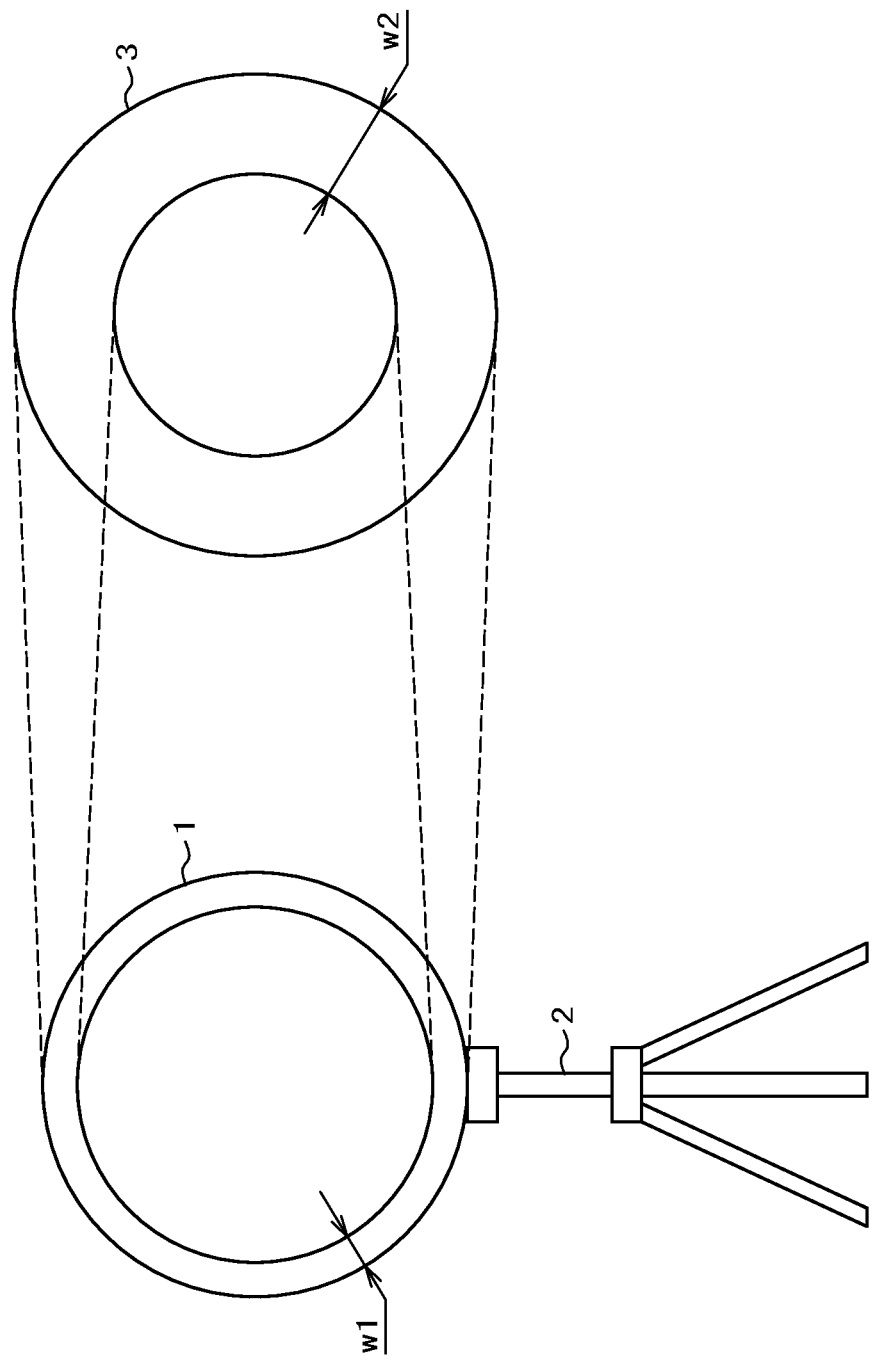
FIG. 1 is a schematic view of an illumination apparatus that forms ring-shaped irradiation light.

FIG. 1 is an example of an illumination apparatus 1 for forming irradiation light 3. In FIG. 1, the view on the left side illustrates the ring-shaped illumination apparatus 1 for forming the irradiation light 3, which is mounted on a support 2. The view on the right side illustrates the irradiation light 3 projected from this illumination apparatus 1.

A large number of light sources are arranged in a circular manner in the ring-shaped illumination apparatus 1. A diffuser may be arranged in front of the light sources to irradiate an extensive area. In FIG. 1, a ring width w2 of the ring-shaped irradiation light 3 is larger than a ring width w1 of the ring-shaped illumination apparatus 1. The reason for this is that light from the ring-shaped illumination apparatus 1 is not collimated and is emitted from the illumination apparatus 1 at a certain light distribution angle.

Figure 2:
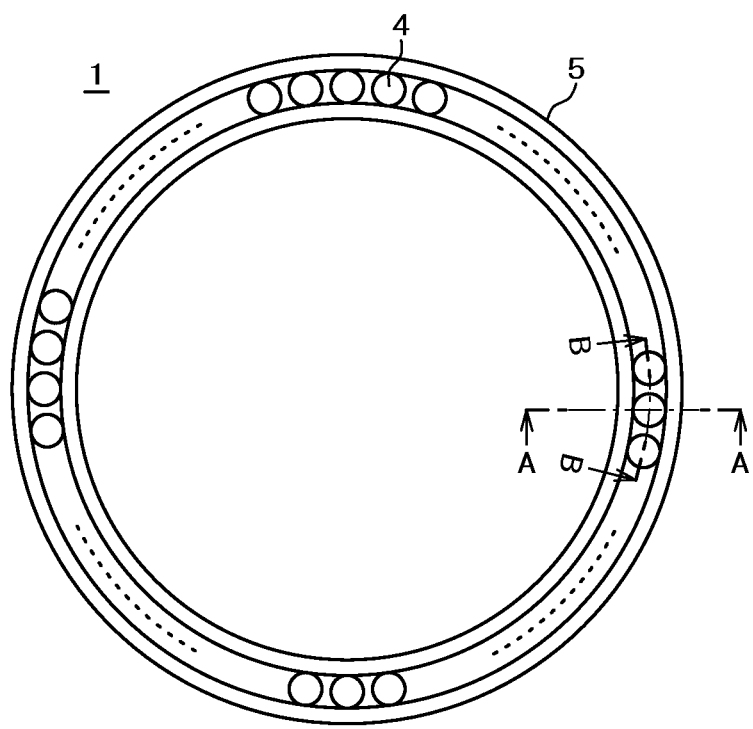
FIG. 2 is a detailed plan view of the illumination apparatus in FIG. 1.

FIG. 2 is a plan view of the ring-shaped illumination apparatus 1 illustrated in FIG. 1. In FIG. 2, a housing 5 accommodating a large number of the light sources 4 is a ring having a U-shaped cross section, and a large number of the light sources 4 are arranged in this U-shaped groove. Each of the light sources 4 includes a light-emitting diode (LED), and in the case where the light sources 4 having a small light distribution angle are used, ring-shaped irradiation light as illustrated in FIG. 1 is formed.

Figure 3:
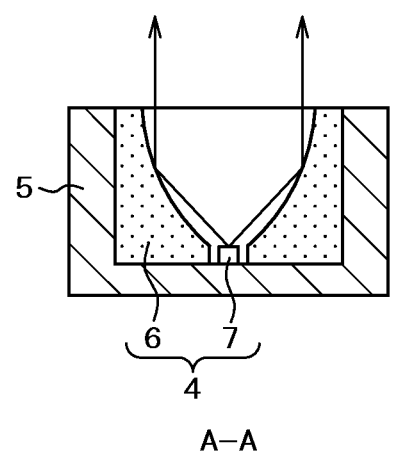
FIG. 3 is a cross-sectional view along A-A in FIG. 2.
Figure 4:
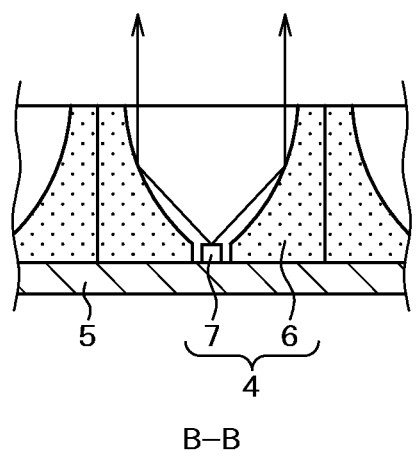
FIG. 4 is a cross-sectional view along B-B in FIG. 2.

FIG. 3 is a cross-sectional view of the light source 4 along A-A in FIG. 2. In FIG. 3, the collimated light source 4 including a funnel reflector 6 and an LED 7 is arranged inside the housing 5 having a U-shaped cross section. FIG. 4 is a cross-sectional view of the light source 4 along B-B in FIG. 2. In FIG. 4, the collimated light sources 4, each of which includes the funnel reflector 6 and the LED 7, are arranged side by side.

In FIG. 3 and FIG. 4, the funnel reflector 6 included in the collimated light source 4 has, for example, a parabolic reflecting surface as an inner surface and reflects light from a point light source to emit collimated light. Hereinafter, a parabola curved surface refers to a hyperboloid or a paraboloid. An emission surface of the funnel reflector 6 is, for example, circular, which makes the cross-sectional shape of the collimated light source circular.

In the ring-shaped illumination apparatus 1 as illustrated in FIG. 2, the diameter of the ring-shaped illumination apparatus 1 is the same as the diameter of the projected ring-shaped irradiation light 3. Therefore, if one attempts to obtain the ring-shaped irradiation light 3 having a large diameter, the ring-shaped illumination apparatus 1 becomes large, which increases the number of collimated light sources 4 to be used.

Also, the distribution angle of light from the ring-shaped illumination apparatus 1 is determined by a characteristic of each of the collimated light sources 4, which results in a small degree of freedom. For example, the width of the ring-shaped irradiation light 3 in FIG. 1 is determined by the light distribution angle of the ring-shaped illumination apparatus 1, which causes the width thereof to be determined by the characteristic of each of the collimated light sources 4. In the case where one desires to change the diameter or width of the ring-shaped irradiation light 3, it is necessary to arrange optical parts such as lenses to suit light emission holes of the collimated light sources 4, which makes a configuration complicated.

Figure 5:
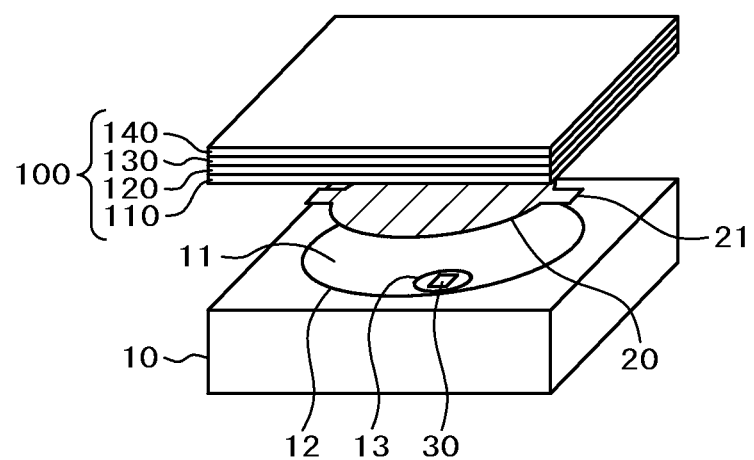
FIG. 5 is an exploded perspective view of an illumination apparatus of embodiment 1.

FIG. 5 is an exploded perspective view of an illumination apparatus of embodiment 1 of the present invention capable of forming ring-shaped irradiation light. In FIG. 5, a funnel reflector 10 is arranged that has a rectangular parallelepiped outer shape, that has a hole 13 for an LED 30, which is a light source, formed in a lower surface thereof, and that emits collimated light from an emission hole 12 in an upper surface thereof. In the funnel reflector 10, the hole 13 for the LED 30 and the emission hole 12 are connected with each other by a parabola curved surface, and collimated light is emitted from the emission hole 12.

In FIG. 5, a light shield 20 is arranged to cover areas other than a periphery of the emission hole 12 of the funnel reflector 10. The reason for this is to form ring-shaped irradiation light by emitting light only from the periphery of the emission hole 12 of the funnel reflector 10. In FIG. 5, tabs 21 are formed to support the light shield 20 on the upper surface of the funnel reflector 10. It should be noted that the tabs 21 become undistinguishable, due to blur, on a projection surface where ring-shaped irradiation light is formed.

Thus, the ring-shaped light source is formed by the LED 30, which is the light source, the funnel reflector 10, and the light shield 20. Although it is possible to form ring-shaped irradiation light by using this configuration, a size, the width, and the like of the ring-shaped irradiation light are specified by these optical elements, which makes it difficult to form a wide variety of ring-shaped illumination.

In the present invention, by arranging, in addition to these components, a liquid crystal lens 100 on the emission surface 12 of the funnel reflector 10, it is possible to control the shape of the ring-shaped irradiation light. That is, it is possible to change the shape of the ring-shaped irradiation light by using an action of the liquid crystal lens 100. In the case of the configuration as illustrated in FIG. 5, it is only necessary to arrange the liquid crystal lens 100 above the rectangular parallelepiped funnel reflector 10, which makes the configuration simple. According to embodiment 1, it is possible to form a wide variety of ring-shaped irradiation light by using an illumination apparatus having a simple configuration as a whole as illustrated in FIG. 5.

Figure 6:
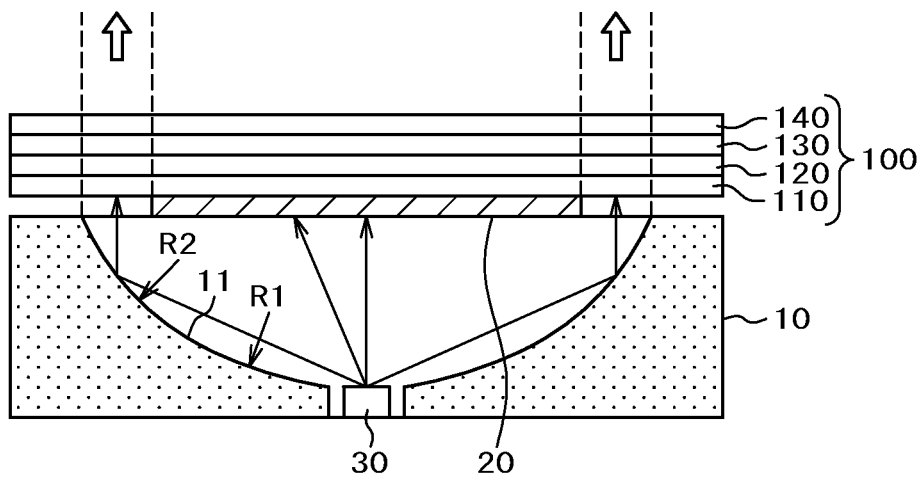
FIG. 6 is a cross-sectional view of the illumination apparatus of embodiment 1.
Figure 7:
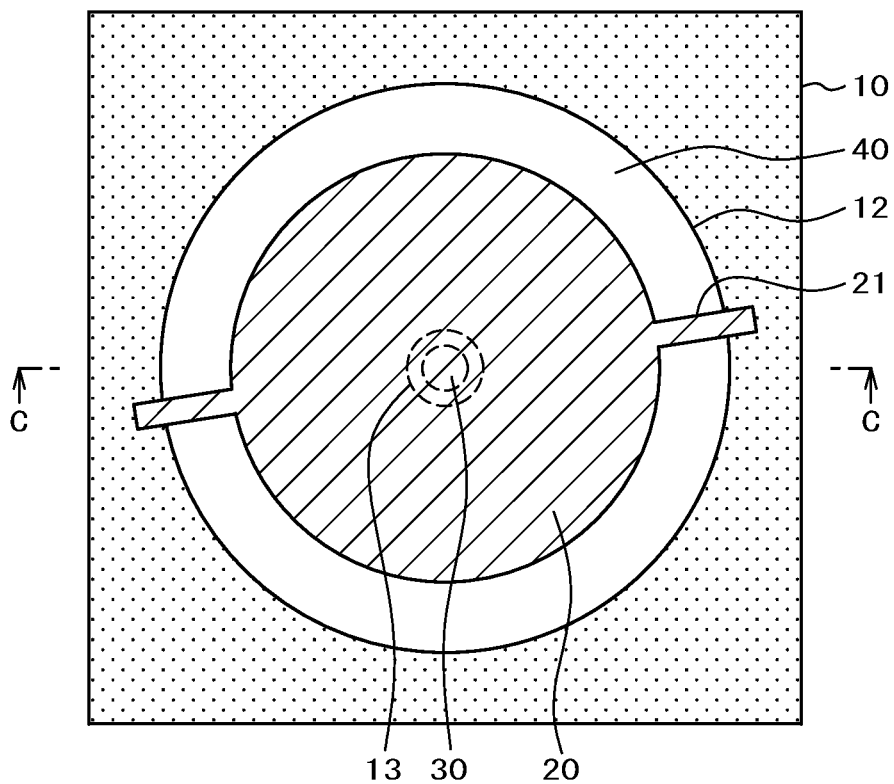
FIG. 7 is a plan view of the illumination apparatus of embodiment 1.

FIG. 6 is a cross-sectional view of FIG. 5, and FIG. 7 is a plan view of FIG. 5. It should be noted that the liquid crystal lens 100 is transparent in FIG. 7 and omitted from the drawing. FIG. 6 corresponds to the cross-sectional view along C-C in FIG. 7. In FIG. 6, a funnel-shaped reflecting surface 11 is formed inside the funnel reflector 10 having a rectangular outer shape. A light emission hole 12 and a hole 13 for arranging the LED 30, which is the light source, are formed in the funnel reflector 10, and at least part of the area between the hole 13 for the LED 30 and the emission hole is the reflecting surface 11 including a parabola curved surface.

In FIG. 6, the LED 30 is arranged inside the hole 13 for the LED formed in the lower surface of the rectangular parallelepiped. It is only necessary for the hole 13 for the LED 30 to be sized large enough to accommodate the LED 30. As for the miniature LED 30, small ones that are approximately 1.5 mm in size as seen in plan view are commercially available. On the other hand, there are cases where surface mount LEDs having high luminance and a large directivity angle are used. The LED 30 may be rectangular as seen from above as illustrated in FIG. 5 or circular as seen from above as illustrated in FIG. 7.

As illustrated in FIG. 6 and FIG. 7, except for the periphery, the emission hole 12 formed in the upper surface of the funnel reflector 10 having the rectangular parallelepiped outer shape is covered by the light shield 20. That is, as illustrated in FIG. 7, the actual emission hole 40 is ring-shaped. Therefore, light emitted from the emission hole 40 is ring-shaped as seen in plan view.

In order to form ring-shaped irradiation light on the irradiated surface, however, it is necessary for the light emitted from the emission hole 40 to be collimated. A curved surface for dealing with this need is formed in the reflecting surface 11 of the funnel reflector 10 of embodiment 1. In FIG. 6, the reflecting surface 11 includes a first curved surface R1 and a second curved surface R2.

As illustrated in FIG. 6, much of emitted light is that reflected by the periphery of the reflecting surface 11, that is, the second curved surface R2. Therefore, it is necessary for the second curved surface R2 to be optimized so as to form collimated light from light from the light source. Part of the second curved surface R2 includes the hyperboloid or the paraboloid. It is only necessary for the first curved surface R1 to be a curved surface connecting the hole for the LED 30 and the second curved surface R2 so as to ensure that the second curved surface R2 is an optimal reflecting surface.

In FIG. 6, much of light from the LED 30, which is the light source, is absorbed by the light shield 20, and light emitted from the LED 20 at a comparatively large angle is used as ring-shaped irradiation light. Therefore, it is preferred, from the viewpoint of light utilization efficiency, that the LED 30, which is the light source, have a large directivity angle characteristic. It is possible to broadly classify LEDs into bullet-shaped LEDs and surface mount devices (SMDs). Although the light emission surfaces of the bullet-shaped LEDs can have a circular plane, luminance thereof is low. In contrast, it is possible to increase the luminance of SMD LEDs, and additionally, many of SMD LEDs have a large directivity angle. Therefore, SMD LEDs are suitable for the present embodiment.

In FIG. 6, much of light emitted from the LED 30 is absorbed by the light shield 20. A light shield having a low light reflectance and capable of absorbing as much light as possible is preferred as the light shield 20. Assuming that light is reflected by the light shield 20, this reflected light is reflected by the reflecting surface 11 of the funnel reflector 10 again and emitted from the emission hole 40. However, this light is not collimated and often has a negative impact on the formation of ring-shaped irradiation light. Light absorptance of the light shield 20 is preferably 80% or more for green light having a wavelength of 500 nm as representative visible light and is more preferably 90% or more.

In the configuration of FIG. 6, collimated light is formed from light emitted from the LED 30 at an angle falling within a predetermined range, which makes it possible to optimally design the second curved surface R2. As illustrated in FIG. 7, the tabs 21 are formed on the light shield 20, and the light shield 20 is supported by the tabs 21 on the upper surface of the funnel reflector 10. The tabs 21 have a small width, which makes the tabs 21 invisible in ring-shaped irradiation light projected onto a screen. The number of tabs 21 is not limited to two as illustrated in FIG. 7, and there may be three or more tabs 21. It should be noted that the light shield 20 may be affixed to the liquid crystal lens 100 which will be described later. In this case, it is possible to support the liquid crystal lens 100 on the upper surface of the funnel reflector 10 via a spacer.

The light shield 20 absorbs light from the LED 30 and, therefore, may become extremely hot, which makes it necessary for the light shield 20 to be made from a heat-resistant material. On the other hand, there are cases where the liquid crystal lens 100 placed on top of the light shield 20 does not provide sufficient characteristics in the event of temperature rise. Therefore, it is desirable that the light shield 20 be made from a material having a low thermal conductivity to ensure that the temperature of the surface of the light shield 20 on the side of the liquid crystal lens 100 does not rise so much even if the temperature of the surface thereof on the side of the LED 30 rises. In the case where such a material with a low light reflectance is not available, it is only necessary to form the light shield 20 by coating the surface of the light shield 20 with a black heat-resistant paint or an equivalent thereof or by other means.

In the meantime, the light shield 20 may have a plurality of layers. That is, a material excellent for use as a light absorber is used as the first surface opposed to the LED 30, and a material having a low thermal conductivity is used as the second surface opposed to the liquid crystal lens 100. In this case, the light shield 20 may be formed by treating the material of the first surface as a base material and coating the first surface with the material of the second surface or by other means. Conversely, the light shield 20 may be formed by treating the material of the second surface as a base material and coating the second surface with the material of the first surface or by other means.

As illustrated in FIG. 6, light emitted from the LED 30 and the funnel reflector 10 enters the liquid crystal lens 100 from outside of the light shield 20 and undergoes necessary lens action on the liquid crystal lens 100, and ring-shaped irradiation light irradiates the screen. It is easier to control light emitted from the liquid crystal lens 100 if the light that has been collimated as much as possible enters the liquid crystal lens 100.

Figure 8:
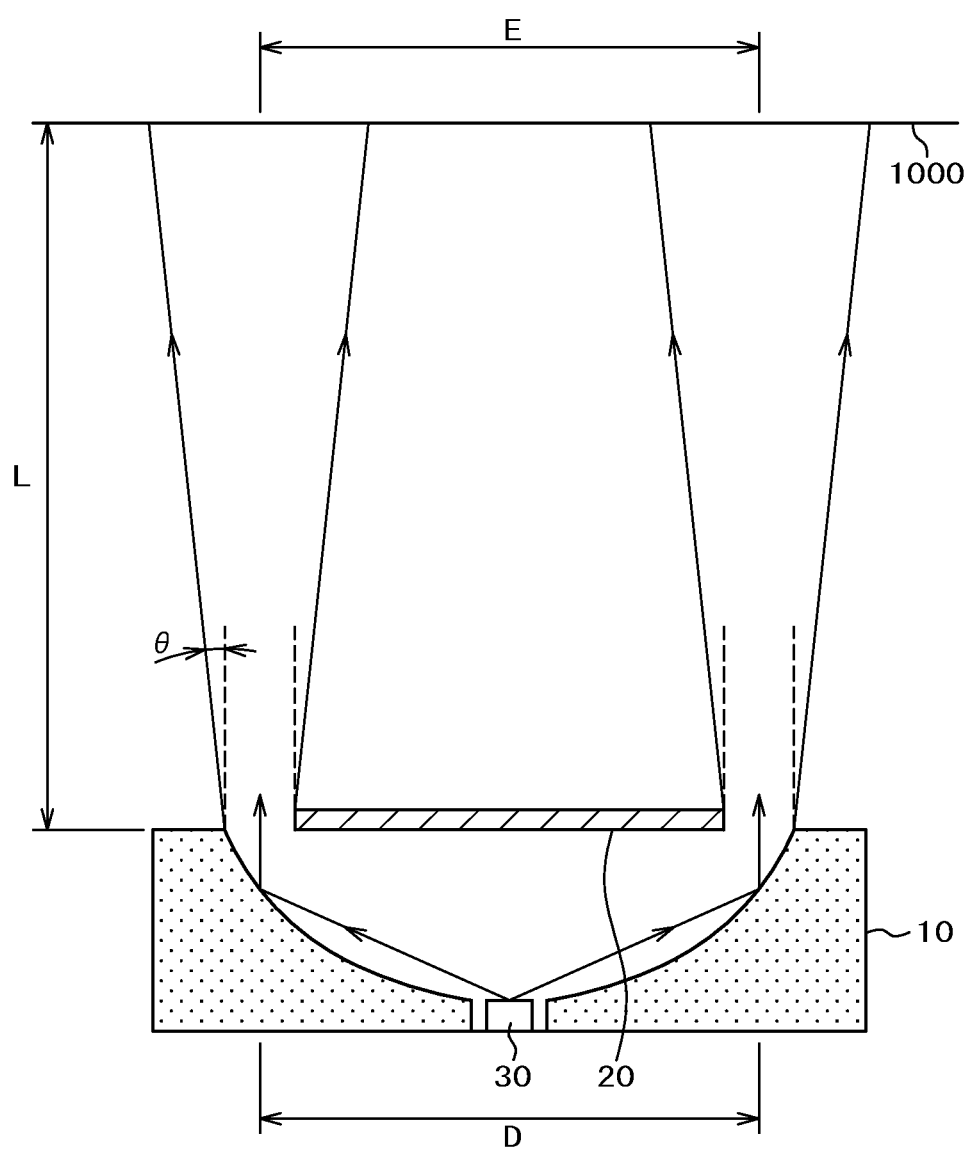
FIG. 8 is an example of illumination light from the illumination apparatus of embodiment 1 in the case where a liquid crystal lens is removed and is the case where ring-shaped irradiation light is formed.

FIG. 8 is a cross-sectional view illustrating a path of light from the light source 30 in the absence of the liquid crystal lens 100. In FIG. 8, collimated light is emitted from outside of the light shield 20. Even though referred to as collimated light, emitted light is not completely collimated, which causes the light to be radiated at a light distribution angle θ. FIG. 8 is an example in which ring-shaped irradiation light irradiates a screen 1000. This is a case where a relationship between a diameter D of the ring-shaped light source of the illumination apparatus, a distance L between the illumination apparatus and the screen 1000, and the light distribution angle θ makes possible the formation of ring-shaped irradiation light on the screen 1000. In FIG. 8, a diameter E of the ring-shaped irradiation light formed on the screen 1000 is the same as the diameter D of a ring-shaped opening of the illumination apparatus.

Figure 9:
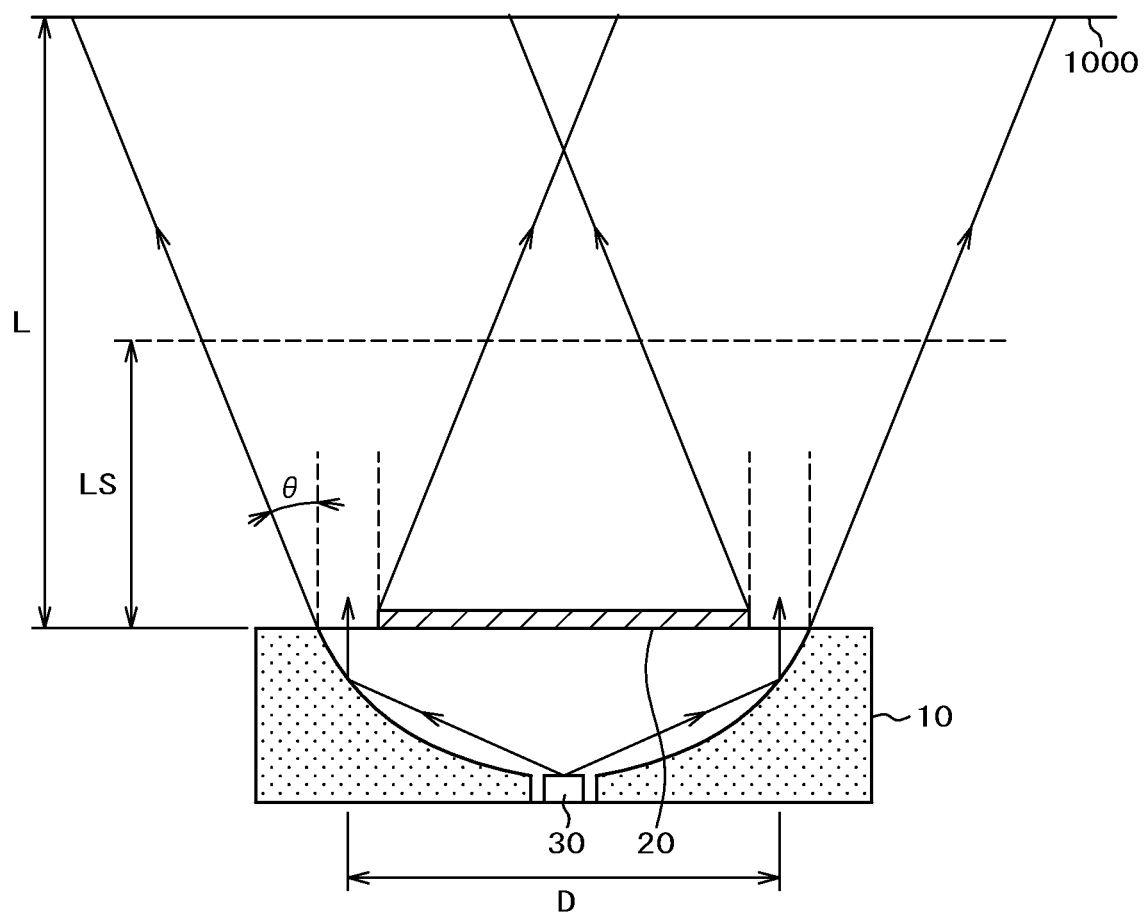
FIG. 9 is another example of illumination light from the illumination apparatus of embodiment 1 in the case where the liquid crystal lens is removed and is the case where ring-shaped irradiation light is not formed.

FIG. 9 is a case where the light distribution angle θ of the illumination apparatus increases in the same structure as in FIG. 8. In this case, illumination light from the left and right emission holes intersects each other on the screen 1000, which prevents the formation of ring-shaped irradiation light. Even if the illumination apparatus has a configuration as illustrated in FIG. 9, if the distance between the illumination apparatus and the screen 1000 is short like LS, ring-shaped irradiation light is formed on the screen 1000.

As illustrated in FIG. 8 and FIG. 9, the diameter D of the ring-shaped emission surface and the light distribution angle θ of emitted light of the illumination apparatus determine up to approximately how far away from the illumination apparatus ring-shaped irradiation light can be formed on the screen 1000.

Figure 10:
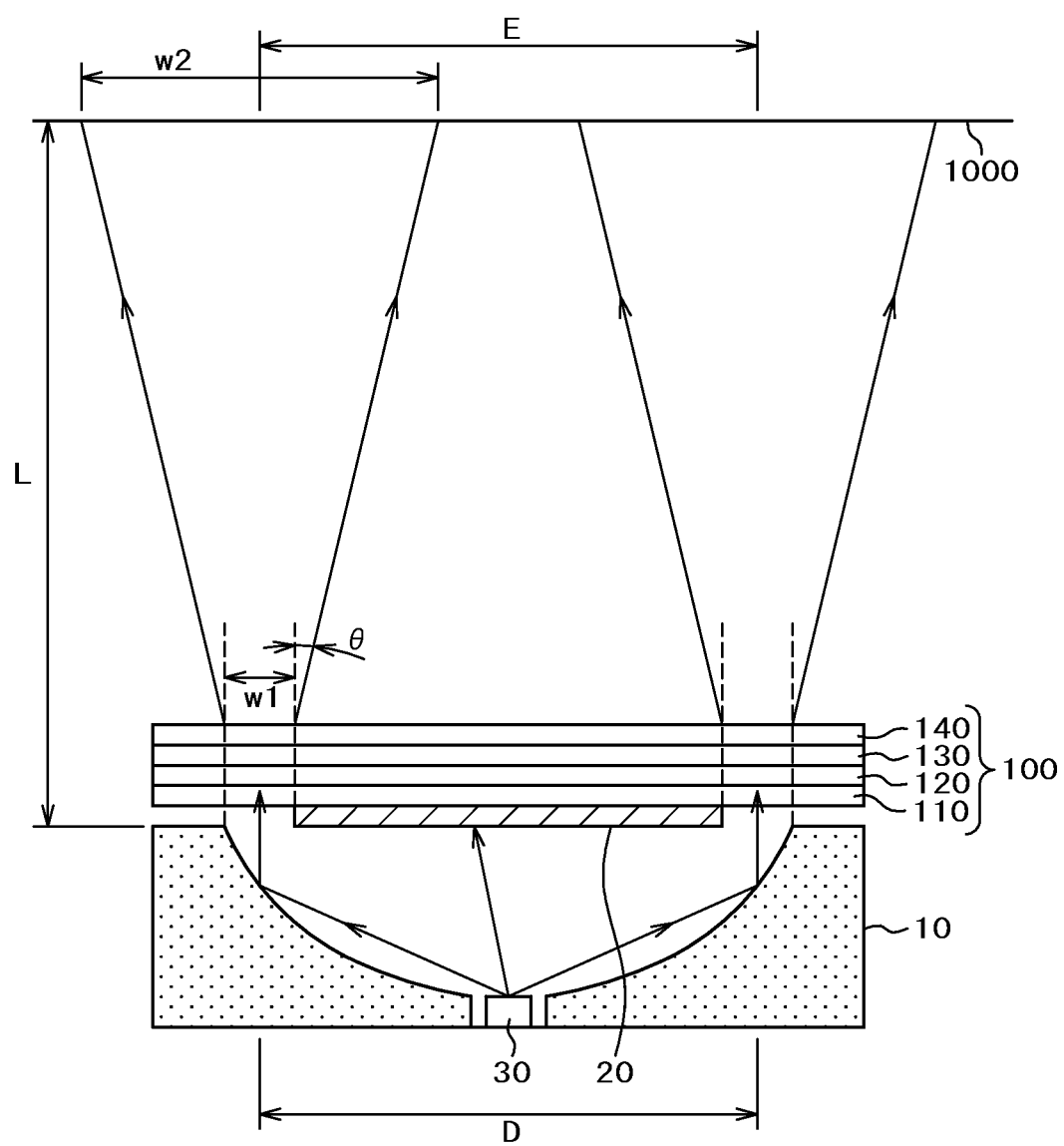
FIG. 10 is an example of illumination light from the illumination apparatus of embodiment 1 in the case where the liquid crystal lens is arranged.

FIG. 10 is a cross-sectional view of the case where the liquid crystal lens 100 is arranged on top of the light shield 20. The liquid crystal lens 100 includes a set of four lenses, i.e., a first liquid crystal lens 110, a second liquid crystal lens 120, a third liquid crystal lens 130, and a fourth liquid crystal lens 140. The reason why four lenses are used will be described later. In FIG. 10, collimated light enters the liquid crystal lens 100 from outside of the light shield 20. This light undergoes lens action on the liquid crystal lens 100 first and then is emitted from the liquid crystal lens 100 at the light distribution angle θ. It is possible to control this light distribution angle θ by using the liquid crystal lens 100.

Although, in FIG. 10, the diameter E of the ring-shaped irradiation light formed on the screen 1000 is the same as the diameter D of the ring-shaped emission hole of the illumination apparatus, the width w2 is larger than the width w1 of the ring-shaped emission hole. This difference is controlled by controlling the light distribution angle of the light emitted by using the liquid crystal lens 100.

Figure 11:
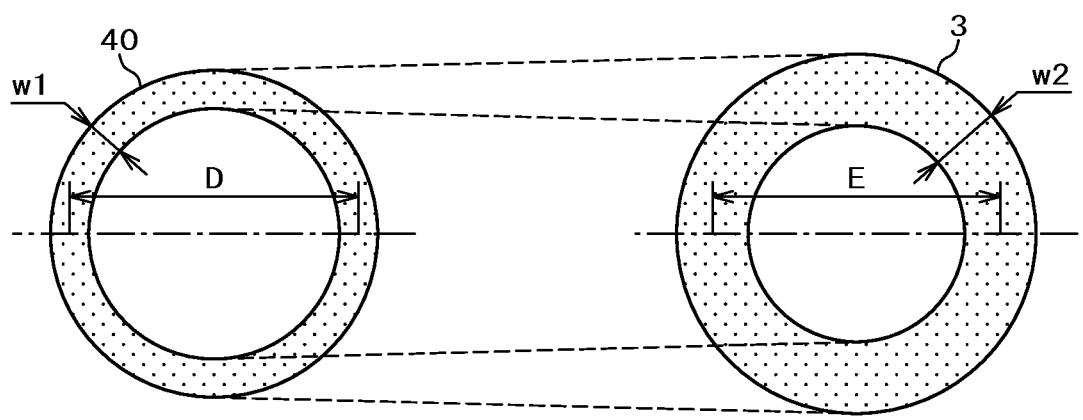
FIG. 11 is an example of ring-shaped irradiation light emitted from the illumination apparatus in FIG. 10.

FIG. 11 is a plan view that compares a ring-shaped emission surface 14 of the illumination apparatus with the ring-shaped irradiation light 3 on the screen 1000. In FIG. 11, the view on the left side is a plan view of the ring-shaped emission hole 40 of the illumination apparatus. D is the diameter, and w1 is the width. The view on the right side is a plan view of the ring-shaped irradiation light 3 on the screen 1000. E is the diameter, and w2 is the width. Although the diameter D is the same size as the diameter E, the width w2 is larger than the width w1. It is possible to control the difference between w2 and w1 by using the liquid crystal lens.

Figure 12:
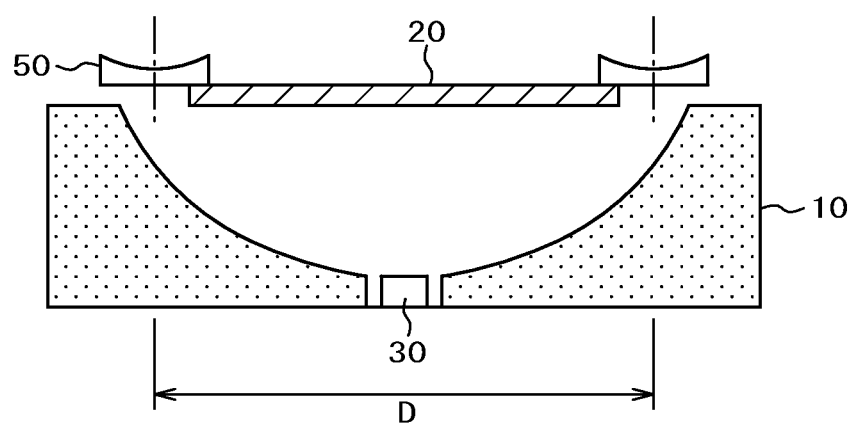
FIG. 12 is a schematic cross-sectional view illustrating an action of the liquid crystal lens in FIG. 11.

The liquid crystal lens 100 as illustrated in FIG. 10 and FIG. 11 is enabled, for example, by controlling the liquid crystal lens 100 so as to form a ring-shaped concave lens 50 along the emission surface of the illumination apparatus as illustrated in FIG. 12. FIG. 12 is a cross-sectional schematic view illustrating only the action of the liquid crystal lens 100. In FIG. 12, the concave lens 50 is arranged so as to block the ring-shaped emission hole of the illumination apparatus. This concave lens 50 is a rotationally symmetric lens. This concave lens covers the top of the emission hole of the illumination apparatus in a ring-shaped manner as seen in plan view.

Figure 13:
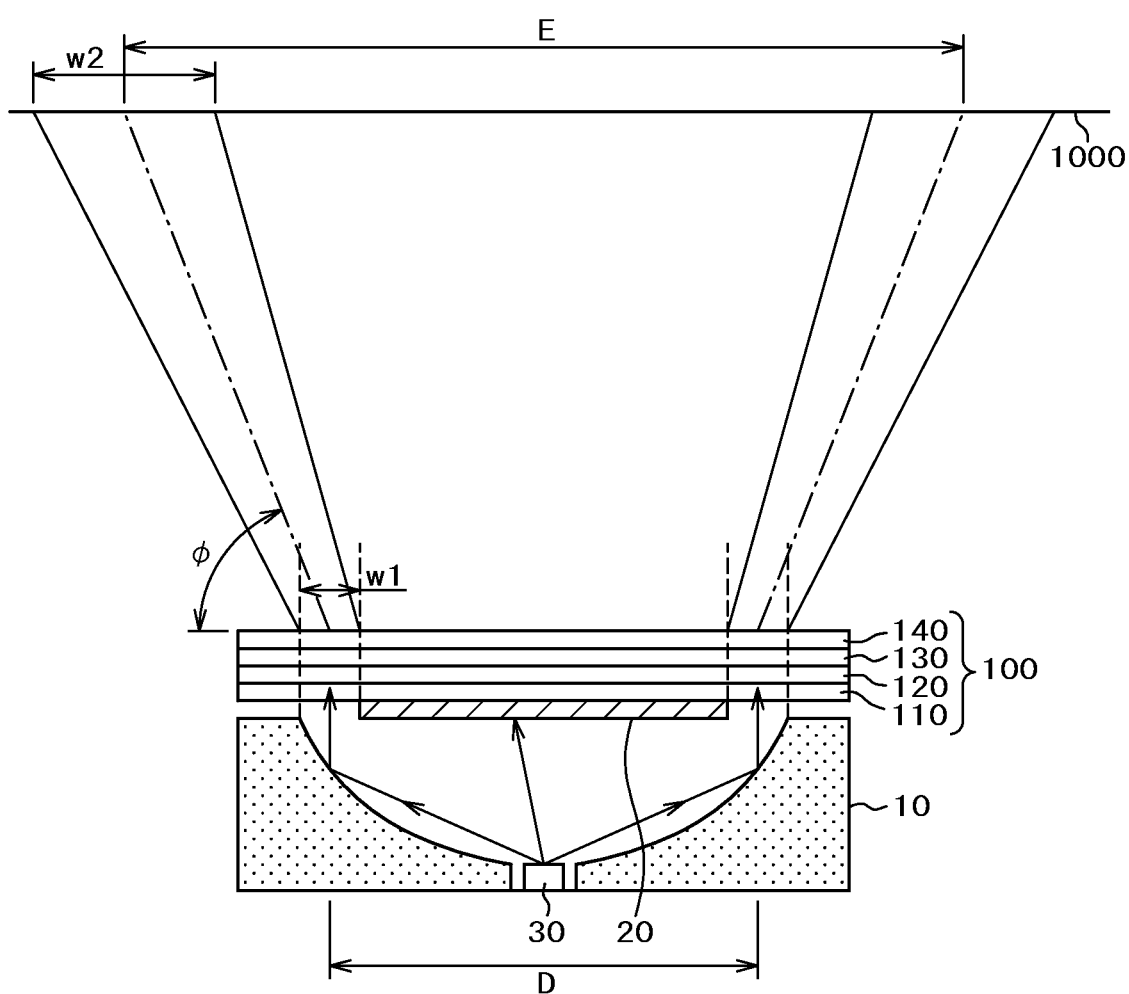
FIG. 13 is another example of illumination light from the illumination apparatus of embodiment 1 in the case where the liquid crystal lens is arranged.

FIG. 13 is a cross-sectional view illustrating another action of the liquid crystal lens 100 in embodiment 1. FIG. 13 differs from FIG. 10 in that the emission direction of light emitted from the liquid crystal lens 100 is not at right angle but at an angle φ with a main surface of the liquid crystal lens 100. Therefore, the diameter E of the ring-shaped irradiation light irradiating the screen 1000 is larger than the diameter D of the ring-shaped emission hole of the illumination apparatus. In the meantime, it is possible to control the relationship between the width w1 of the ring-shaped emission hole of the illumination apparatus and the width w2 of the ring-shaped irradiation light projected onto the screen 1000 by controlling the light distribution angle θ of light emitted from the liquid crystal lens 100 by using the liquid crystal lens 100.

Figure 14:
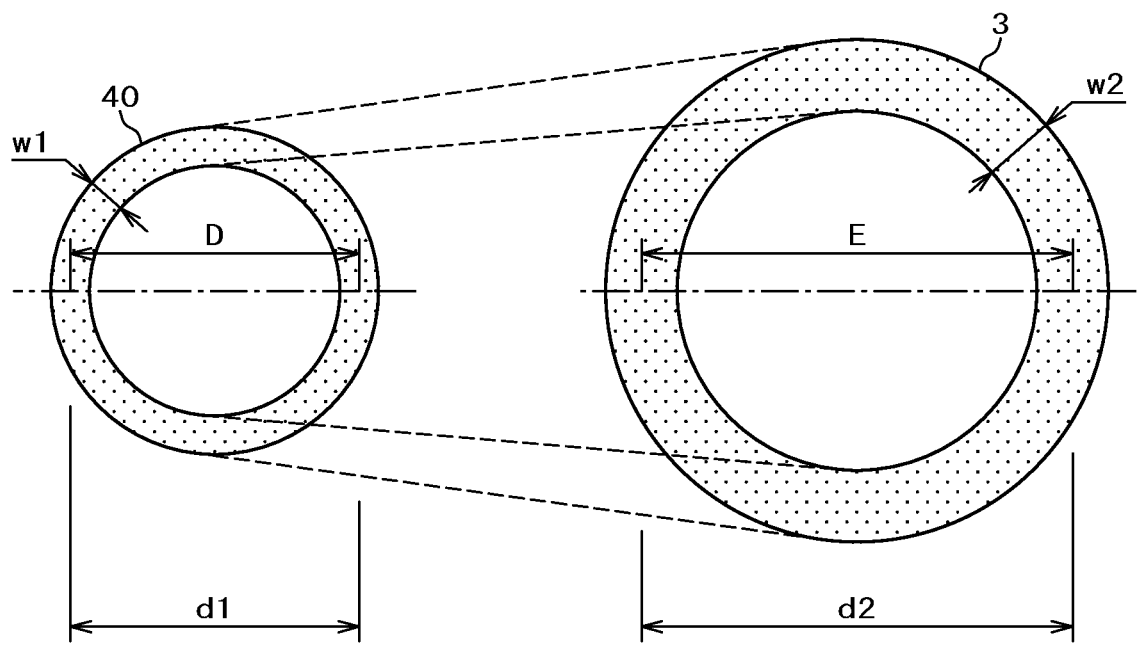
FIG. 14 is an example of ring-shaped irradiation light emitted from the illumination apparatus in FIG. 13.

FIG. 14 is a plan view illustrating the relationship between the emission hole of the illumination apparatus and the ring-shaped irradiation light on the screen 1000. In FIG. 14, the view on the left side is a plan view of the ring-shaped emission hole of the illumination apparatus. D is the diameter, and w1 is the width. The view on the right side is a plan view of the ring-shaped irradiation light 3 on the screen 1000. E is the diameter, and w2 is the width. In FIG. 14, the diameter E is larger than the diameter D. Also, the width w2 is larger than the width 1. It is possible to control the difference between E and D and the difference between w2 and w1 by using the liquid crystal lens.

Figure 15:
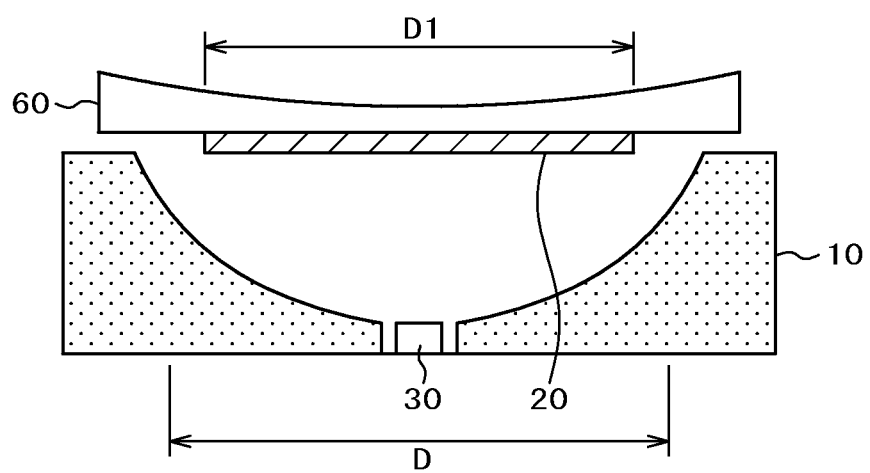
FIG. 15 is a schematic cross-sectional view illustrating the action of the liquid crystal lens in FIG. 13.

The liquid crystal lens 100 as illustrated in FIG. 13 and FIG. 14 is enabled, for example, by controlling the liquid crystal lens 100 so as to form a large concave lens 60 on the emission surface of the illumination apparatus as illustrated in FIG. 15. FIG. 15 is a cross-sectional schematic view illustrating only the action of the liquid crystal lens 100. In FIG. 15, the large concave lens 60 is arranged so as to include the ring-shaped emission hole of the illumination apparatus and cover almost the entire emission surface. This concave lens 60 is a rotationally symmetric lens.

It should be noted that, in FIG. 15, it is not necessary to form an accurate lens because no light is emitted from the area of the diameter Dl covered by the light shield 20. FIG. 15 is a view for giving one an idea of the action of the liquid crystal lens 100. The action of the liquid crystal lens 100 can change the shape of the lens by using a voltage applied to electrodes inside the liquid crystal lens 100.

Figure 16:
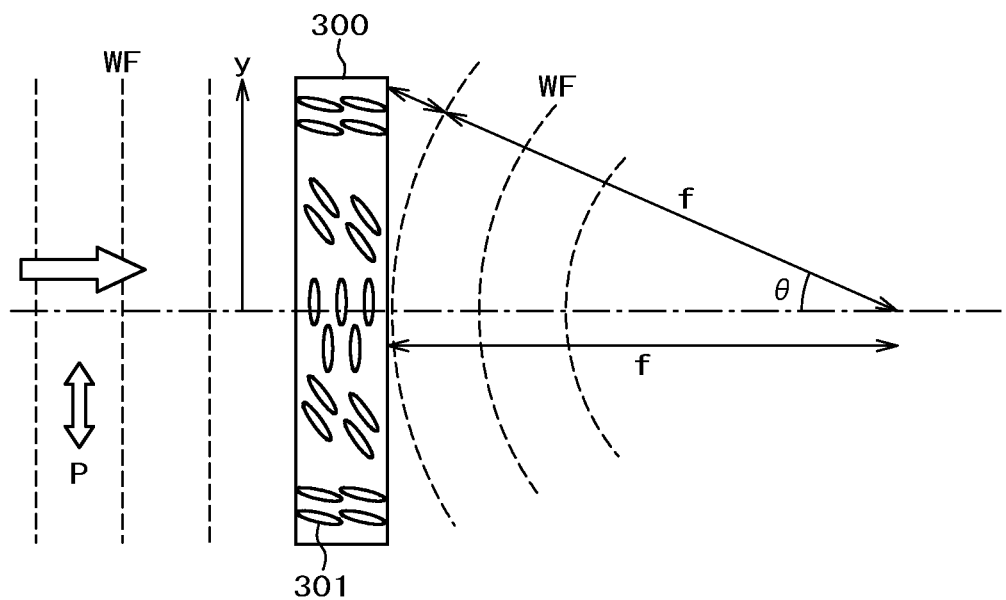
FIG. 16 is a cross-sectional view describing operation of the liquid crystal lens.

FIG. 16 is a cross-sectional view illustrating a principle behind the liquid crystal lens 100. In FIG. 16, collimated light enters the lens from the left side of a liquid crystal layer 300. P in FIG. 16 means a polarization direction of incident light. The ordinary polarization direction of light is randomly distributed. However, liquid crystal has an anisotropic refractive index. For this reason, FIG. 16 illustrates the action of light polarized in the P direction.

In FIG. 16, liquid crystal molecules 301 are aligned in the liquid crystal layer 300 such that the closer the molecules are to the periphery of the liquid crystal layer 300, the more inclined they are. The liquid crystal molecules 301 are long and narrow in shape, and the effective refractive index of the liquid crystal molecules 301 in a major axis direction is higher than the effective refractive index of the liquid crystal molecules 301 in a minor axis direction. For this reason, the closer they are to the periphery of the liquid crystal layer 300, the higher the refractive index, which causes a convex lens to be formed. In FIG. 16, a dotted line is a light wavefront WF, and f is a focal distance.

Figure 17:
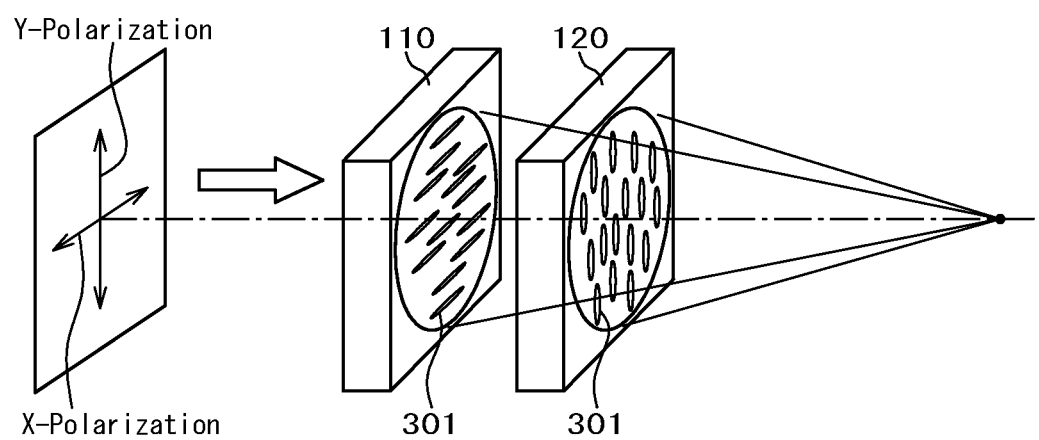
FIG. 17 is another cross-sectional view describing the operation of the liquid crystal lens.

Liquid crystal has an anisotropic refractive index. For this reason, in order to form a lens, a second lens is necessary that acts on light polarized at right angle with the polarization direction of light acted on by a first lens. FIG. 17 is an exploded perspective view illustrating this lens configuration. In FIG. 17, a parallelogram on the left side is the light wavefront. That is, light polarized in x direction and y direction enters the liquid crystal layer 300. A first liquid crystal lens 110 is a lens that acts on x-polarized light, and a second liquid crystal lens 120 is a lens that acts on y-polarized light.

In FIG. 17, the first liquid crystal lens 110 and the second liquid crystal lens 120 differ by 90 degrees in initial alignment direction of the liquid crystal molecules 301. The initial alignment of the liquid crystal molecules 301 is determined by the alignment direction of an alignment film inside the liquid crystal lens. That is, in FIG. 17, the alignment directions of the alignment films in substrates on the sides where light enters the two liquid crystal lenses 110 and 120 are at right angle with each other.

Figure 18:
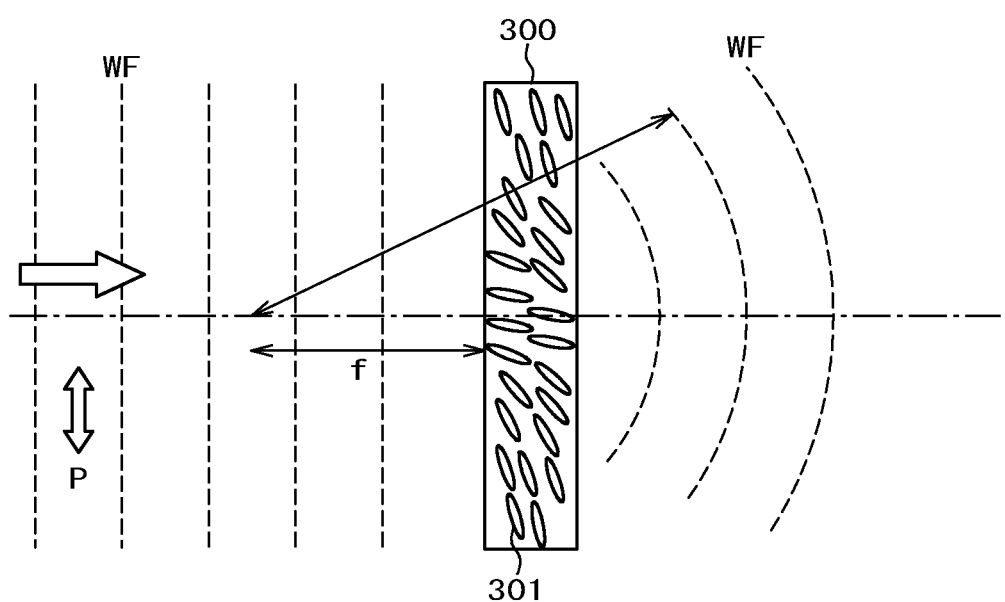
FIG. 18 is still another cross-sectional view describing the operation of the liquid crystal lens.

FIG. 18 is a case where a concave lens is formed by a liquid crystal lens. In FIG. 18, light whose wavefront WF is parallel to the liquid crystal layer 300 and that is polarized in one direction enters the liquid crystal layer 300 from the left side. In FIG. 18, the liquid crystal molecules 301 in the liquid crystal layer 300 are aligned most in the vicinity of an optical axis by the electrodes, and the alignment angle decreases as the molecules become closer to the periphery. Because of the lens configuration according to such a liquid crystal alignment, the wavefront WF of light that has passed through the liquid crystal layer 300 changes into a curve as illustrated by a dotted line in FIG. 12, which causes a concave lens to be formed. It should be noted that two liquid crystal lenses are similarly necessary in the case of a concave lens as illustrated in FIG. 17.

Figure 19:
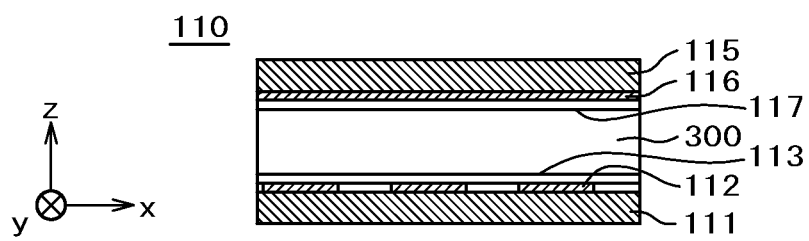
FIG. 19 is a cross-sectional view of a first liquid crystal lens.

FIG. 19 is a detailed cross-sectional view of the liquid crystal lens 110. In FIG. 19, first electrodes 112 are formed on top of a TFT substrate 111, and a first alignment film 113 is formed so as to cover the first electrodes 112. The alignment direction of the first alignment film 113 determines, of incident light, polarized light in the direction that will undergo the action of the liquid crystal lens. A second electrode 116 is formed on the inside of an opposed substrate 115, and a second alignment film 117 is formed so as to cover the second electrode 116. The relationship between the alignment direction of the first alignment film 113 and the alignment direction of the second alignment film 117 is determined by what type of liquid crystal is used. The liquid crystal layer 300 is sandwiched between the TFT substrate 111 and the opposed substrate 115.

Figure 20:
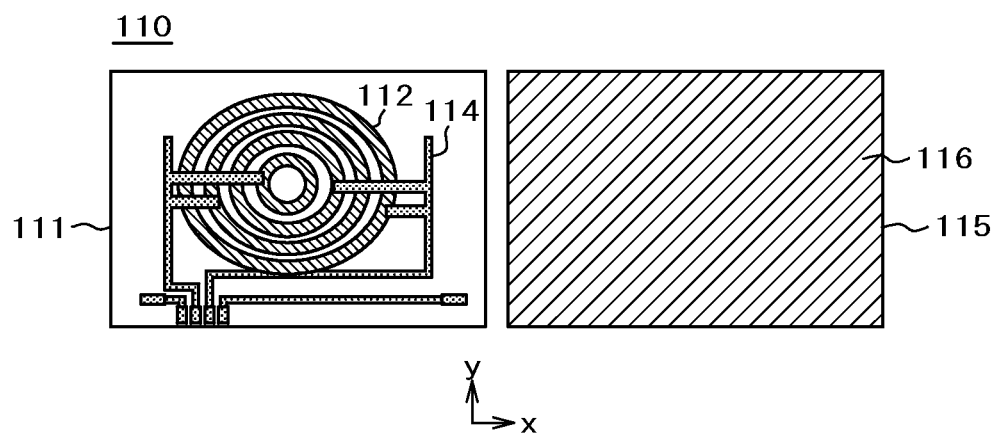
FIG. 20 is a plan view illustrating the shape of electrodes of the first liquid crystal lens.

The view on the left side in FIG. 20 is a plan view of the first electrodes 112 formed on the first substrate 111. The first electrodes 112 are a plurality of concentric circles. A lead 114 for applying a voltage is connected to each of the circular electrodes 112. The view on the right side in FIG. 20 is a plan view illustrating the shape of the second electrode 116 formed on the opposed substrate 115. The second electrode 116 is a planar electrode and is formed over almost the entire surface of the opposed substrate 115.

In FIG. 20, it is possible to form lenses having a wide variety of strengths by changing the voltage between the first electrode 112 and the second electrode 116. The examples in FIG. 19 and FIG. 20 make it possible to easily form circular lenses because the first electrodes 112 are concentrically formed.

The liquid crystal lens 110 described in FIG. 19 and FIG. 20 is a lens that acts on one direction such as polarized light PX. However, light from the LED 10 is polarized in all directions, which requires a liquid crystal lens that acts on light PY polarized at right angle with PX.

Figure 21:
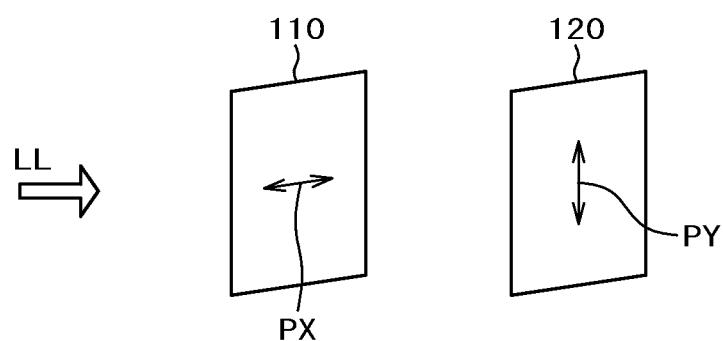
FIG. 21 is a perspective view illustrating the operation of the first liquid crystal lens and a second liquid crystal lens.

FIG. 21 is a perspective view illustrating this configuration. In FIG. 21, when light LL from the LED enters the first liquid crystal lens 110 from the left side, light polarized in the PX direction by the first liquid crystal lens 110 undergoes the action of the liquid crystal lens. Light polarized in the PY direction is not affected by the first liquid crystal lens 110. Light polarized in the PY direction undergoes the action of the liquid crystal lens by the second liquid crystal lens 120. Light polarized in the PX direction does not undergo the action of the second liquid crystal lens 120. This makes it possible for both light polarized in the x direction and light polarized in the y direction to undergo the action of the liquid crystal lens.

Figure 22:
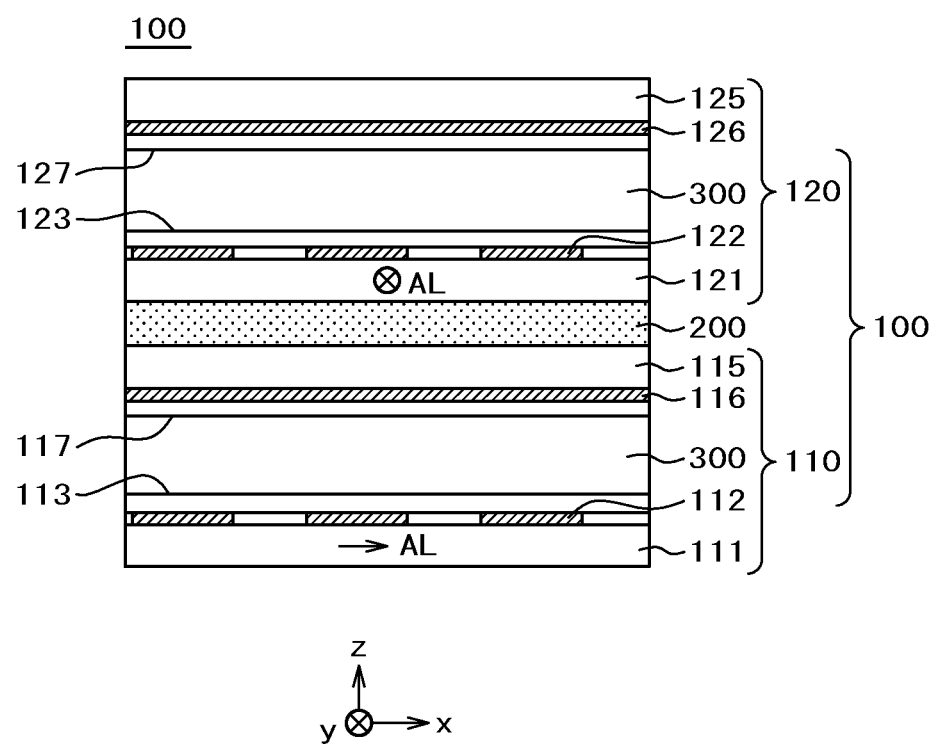
FIG. 22 is a cross-sectional view illustrating stacking of the first crystal lens and the second liquid crystal lens on top of each other.

FIG. 22 is a cross-sectional view illustrating stacking of the first liquid crystal lens 110 and the second liquid crystal lens 120 on top of each other. The first liquid crystal lens 110 and the second liquid crystal lens 120 are bonded to each other by a transparent bonding agent 200. In FIG. 22, the second liquid crystal lens 120 has the same electrode configuration as the first liquid crystal lens 110. That is, third electrodes 122 are formed on a TFT substrate 121 in the second liquid crystal lens 120, and a third alignment film 123 is formed on top thereof. A fourth electrode 126 is formed on top of an opposed substrate 125, and a fourth alignment film 127 is formed on top thereof.

The second liquid crystal lens 120 differs from the first liquid crystal lens 110 in the alignment direction of the alignment film 123. In FIG. 22, AL represents the alignment direction of the alignment film 113. In FIG. 22, the alignment direction of the first alignment film 113 formed on the TFT substrate 111 in the first liquid crystal lens 110 is, for example, the x direction. The alignment direction of the third alignment film 123 formed on the TFT substrate 121 in the second liquid crystal lens 120 is, for example, the y direction. That is, light polarized in the x direction and light polarized in the y direction can both undergo the action by the two liquid crystal lenses 110 and 120.

It should be noted that the alignment direction of the second alignment film 117 formed on the opposed substrate 115 in the first liquid crystal lens 110 and the alignment direction of the fourth alignment film 127 formed on the opposed substrate 125 in the second liquid crystal lens 120 are determined by what type of liquid crystal is used as the liquid crystal layer 300. That is, there are some cases where the second alignment film 117 is aligned in the same direction as the first alignment film 113, and there are other cases where the second alignment film 117 is aligned at right angle with the first alignment film 113 in the first liquid crystal lens 110. The relationship between the third alignment film 123 and the fourth alignment film 127 in the second liquid crystal lens 120 is the same.

Figure 23:
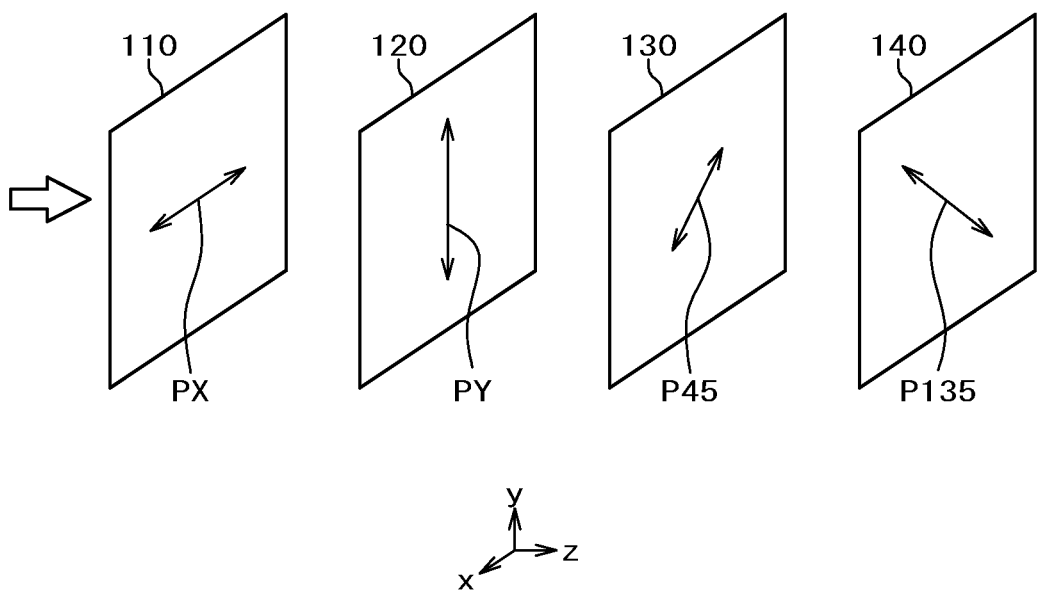
FIG. 23 is a perspective view illustrating the operation of the first liquid crystal lens, the second liquid crystal lens, a third liquid crystal lens and a fourth liquid crystal lens.

Incidentally, light from the LED 10 is polarized in all directions. For this reason, there are cases where sufficient action of the liquid crystal lens is not obtained if only PX- or PY-polarized light is acted on. In this case, as illustrated in FIG. 23, it is only necessary to add, for example, the liquid crystal lens 130 that acts on light P45 polarized in a 45-degree direction with respect to the x direction and the liquid crystal lens 140 that acts on light P135 polarized in a 135-degree direction with respect to the x direction.

Thus, it is possible to form various types of ring-shaped irradiation light as necessary without changing the shape of the illumination apparatus by using a liquid crystal lens.

Embodiment 2

Figure 24:
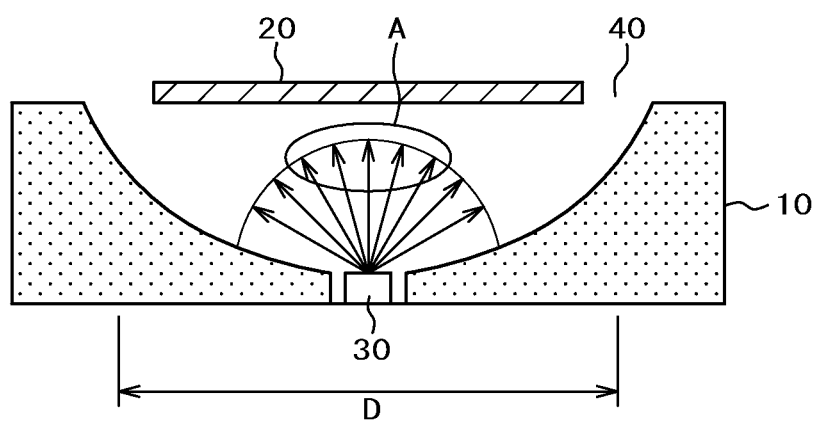
FIG. 24 is a cross-sectional view illustrating a distribution of light emitted from a light-emitting diode (LED) inside a funnel reflector.

FIG. 24 is a cross-sectional view illustrating a distribution of light emitted from the LED 30 as the light source. Even if the LED 30 having a comparatively large directivity angle is used, the emission direction is vertical with respect to the emission surface of the LED 30, that is, a luminous intensity of an area A illustrated in FIG. 24 is high. Therefore, the configuration as illustrated in FIG. 24 has a low utilization efficiency of light from the LED 30. Using the inside of the light shield 20 as a reflecting surface to increase the light utilization efficiency makes it difficult to control light from the reflecting surface of the light shield 20, which makes it difficult to collimate light emitted from the ring-shaped emission hole.

Figure 25:
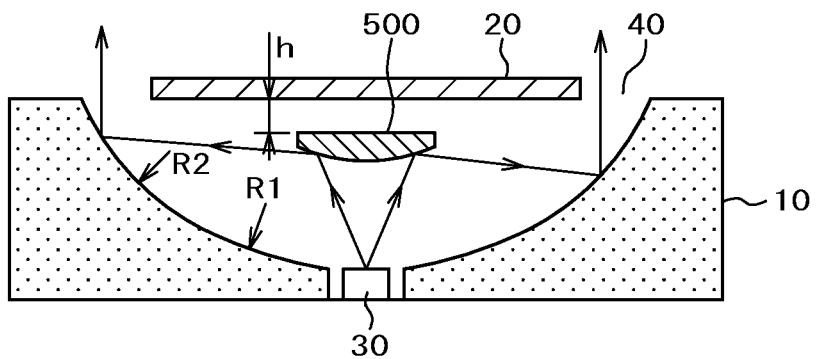
FIG. 25 is a cross-sectional view of the illumination apparatus with the liquid crystal lens removed in embodiment 2.
Figure 26:
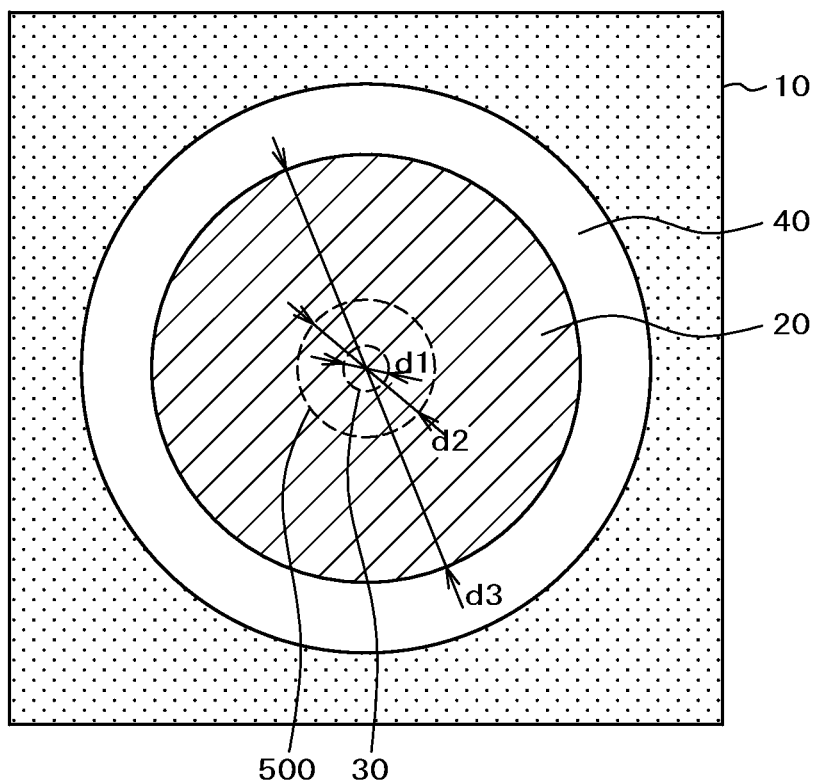
FIG. 26 is a plan view of FIG. 25 as seen from above.

FIG. 25 and FIG. 26 are a cross-sectional view and a plan view of the illumination apparatus in embodiment 2 that has measures in place to prevent this problem. It should be noted that although omitted in FIG. 25 and FIG. 26, the liquid crystal lens 100 is used as in embodiment 1 in the actual illumination apparatus. In the present embodiment, as illustrated in FIG. 25, a reflector 500 is arranged at the area with high luminance from the LED 30, that is, a portion corresponding to the area A in FIG. 24, and light from the reflector 500 is directed toward the second curved surface R2 on the reflecting surface 11 of the funnel reflector 10. Then, light reflected by the curved surface R2 is emitted from the ring-shaped emission hole 40 of the illumination apparatus as collimated light.

In FIG. 25, the surface of the reflector 500 opposed to the LED 30 is set as a curved surface that reflects light from the LED 30 and causes the light to enter the curved surface R2 of the funnel reflector 10. It is possible to make the diameter of the reflector 500 significantly smaller than the diameter of the light shield 20, which makes it possible to set the curved surface of the reflector 500 so as to provide such an action.

Conversely, it is only necessary to restrict the diameter of the reflector 500 approximately to a size that allows light emitted from the ring-shaped emission hole 40 of the illumination apparatus to remain collimated. Nevertheless, it is possible to use light at the area where the luminous intensity of light from the LED 30 is high, which makes it possible to improve the light utilization efficiency.

FIG. 26 is a plan view of FIG. 25 as seen from above. In FIG. 26, the reflector 500, the light shield 20, and the ring-shaped emission hole 40 are arranged concentrically around the LED 30. In FIG. 26, a diameter d2 of the reflector 500 is larger than a diameter d1 of the LED, and a diameter d3 of the light shield 20 is larger than the diameter d2 of the reflector 500.

Referring back to FIG. 25, it is possible to set a vertical distance h between the reflector 500 and the light shield 20 freely such that the angle of reflected light from the reflector 500 falls within the predetermined range. Although, in FIG. 25, the reflector 500 appears as if it is floating in the air, the reflector 500 may be suspended from the light shield 20 or supported by a column erected on the first curved surface R1 of the funnel reflector 10.

Thus, according to embodiment 2, it is possible to provide an illumination apparatus having a high utilization efficiency of light from the LED 30, which is the light source, and capable of emitting collimated ring-shaped emitted light. It is also possible to obtain a similar advantageous effect to that described in embodiment 1 by using the liquid crystal lens 100.

Although it has been described so far that only one LED 30, which is the light source, is used, the plurality of LEDs 30 may be used in the case where sufficient illuminance cannot be obtained. Also, although it has been described so far that the ring is circular, the present invention is not limited to a circular ring and is applicable to cases where the ring is rectangular, elliptic, or in other shape.

Also, the illumination apparatus according to the present invention has a comparatively simple structure, which makes it possible to reduce the size of the illumination apparatus. Therefore, the illumination apparatus is also applicable to miniature optical equipment. In the meantime, it is also possible to dealing with large ring-shaped irradiation light by using the action of the liquid crystal lens.

What is claimed is:

1. An illumination apparatus comprising:
a first reflector having a first hole where a light source is arranged, a second hole that emits light, and a reflecting curved surface that connects the first hole and the second hole;
a light shield arranged at an area including a center of the second hole as seen in plan view;
an opening portion formed in a ring-shaped manner between an inner edge of the second hole and an outer edge of the light shield; and
a liquid crystal lens arranged so as to cover the opening portion.

2. The illumination apparatus according to claim 1, wherein
the first reflector has a rectangular parallelepiped outer shape,
the first hole is formed in a first surface of the rectangular parallelepiped,
the second hole is formed in a second surface opposed to the first surface, and
a main surface of the light shield is formed parallel to the second surface.

3. The illumination apparatus according to claim 2, wherein
the light shield is attached to the second surface of the first reflector via tabs attached to the light shield.

4. The illumination apparatus according to claim 2, wherein
the light shield is attached to the liquid crystal lens.

5. The illumination apparatus according to claim 1, wherein
the curved surface of the first reflector has a first curved surface close to the first hole and a second curved surface close to the second hole, and
part of the second curved surface has a hyperboloid or a paraboloid.

6. The illumination apparatus according to claim 1, wherein
an absorptance of a surface of the light shield, the surface being opposed to the light source, for light having a wavelength of 500 nm is 80% or more.

7. The illumination apparatus according to claim 5, wherein
a second reflector is arranged between the light shield and the light source, and
a surface of the second reflector on a side opposed to the light source is a third reflecting surface.

8. The illumination apparatus according to claim 7, wherein
the third reflecting surface is a curved surface that reflects light from the light source and directs the light toward the second curved surface of the first reflector.

9. The illumination apparatus according to claim 7, wherein
a space is present between the second reflector and the light shield.

10. The illumination apparatus according to claim 1, wherein
the ring is circular.

11. The illumination apparatus according to claim 1, wherein
the liquid crystal lens has a first liquid crystal lens, a second liquid crystal lens, a third liquid crystal lens, and a fourth liquid crystal lens.

12. The illumination apparatus according to claim 11, wherein
the first liquid crystal lens, the second liquid crystal lens, the third liquid crystal lens, and the fourth liquid crystal lens act on, of incident light, different polarized light.

* * * * *